United States Statutory Invention Registration [19]

[11] Reg. Number: H114

Quintavalle [45] Published: Aug. 5, 1986

[54] PRACTICE PROJECTILE ASSEMBLY

[75] Inventor: Richard M. Quintavalle, Freeland, Md.

[73] Assignee: The United States of America as represented by the Secretary of the Army, Washington, D.C.

[21] Appl. No.: 824,327

[22] Filed: Jan. 29, 1986

[51] Int. Cl.[4] ..... F42B 11/16

[52] U.S. Cl. ..... 102/513

*Primary Examiner*—Harold J. Tudor

*Attorney, Agent, or Firm*—Anthony T. Lane; Harold H. Card, Jr.; Michael C. Sachs

[57] ABSTRACT

There is disclosed a practice projectile assembly comprised of a body member, a windshield member formed of a frangible material mounted to the body member thereby forming a chamber, a signal powder disposed in a portion of the chamber proximate the windshield member, and a piston member disposed in the chamber whereby upon impact of the projectile assembly the piston assembly assists in fracturing the windshield member to effect dispersion of the signal powder.

12 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRACTICE PROJECTILE ASSEMBLY

GOVERNMENTAL INTEREST

The Government has rights in this invention pursuant to contract number DAAK-10-80-C-0211 awarded by the Department of the Army.

BACKGROUND AND FIELD OF THE INVENTION

This invention relates to a projectile assembly, and more particularly to a practice projectile assembly.

The use of practice munitions as a training aid has been and is necessary to finely hone the skills of the user. With certain forms of munitions, e.g. a high explosive dual purpose (HEDP) projectile, it is desirable to produce a visible signal at the point of impact to permit observation by the user or gunner of the effectiveness of his aiming of the weapon during launch of such a projectile. In this connection, the use of frangible components and marker dyes are components in such a projectile has been common, however, the effectiveness of such projectiles has been of a questionable nature. For example, the projectile may not necessarily fracture upon impact on all types of surfaces; the projectile may fracture during normal handling and launch; the projectile may not provide adequate visual response upon impact; etc.

OBJECTS OF THE INVENTION

An object of the present invention is to provide an improved practice projectile assembly.

Another object of the present invention is to provide an improved practice projectile assembly exhibiting improved safety handling capabilities prior to launch.

A further object of the present invention is to provide an improved practice projectile assembly of improved visual impact effectiveness on all types of surfaces.

Yet another object of the present invention is to provide an improved practice projectile assembly producing a more observable visual effect upon impact.

A still further object of the present invention is to provide an improved practice projectile assembly exhibiting ballistic characteristics similar to an HEDP projectile.

Still another object of the present invention is to provide an improved practice projectile assembly formed of inexpensive materials of construction.

Yet another object of the present invention is to provide an improved practice projectile assembly which is readily assembled in a facile manner.

SUMMARY OF THE INVENTION

These and other objects of the present invention are achieved by a projectile assembly comprised of a body member, a windshield member formed of a frangible material mounted to the body member thereby forming a chamber, a signal powder disposed in a portion of the chamber proximate the windshield member, and a piston member disposed in the chamber whereby upon impact of the projectile assembly the piston assembly assists in fracturing the windshield member to effect dispersion of the signal powder.

BRIEF DESCRIPTION OF THE DRAWING

A better understanding of the present invention will become more apparent from the following detailed description thereof especially when taken with the accompanying drawing of an elevational view, partially in section, of the present invention mounted in a cartridge base.

DETAILED DESCRIPTION OF THE INVENTION

Figure 1:
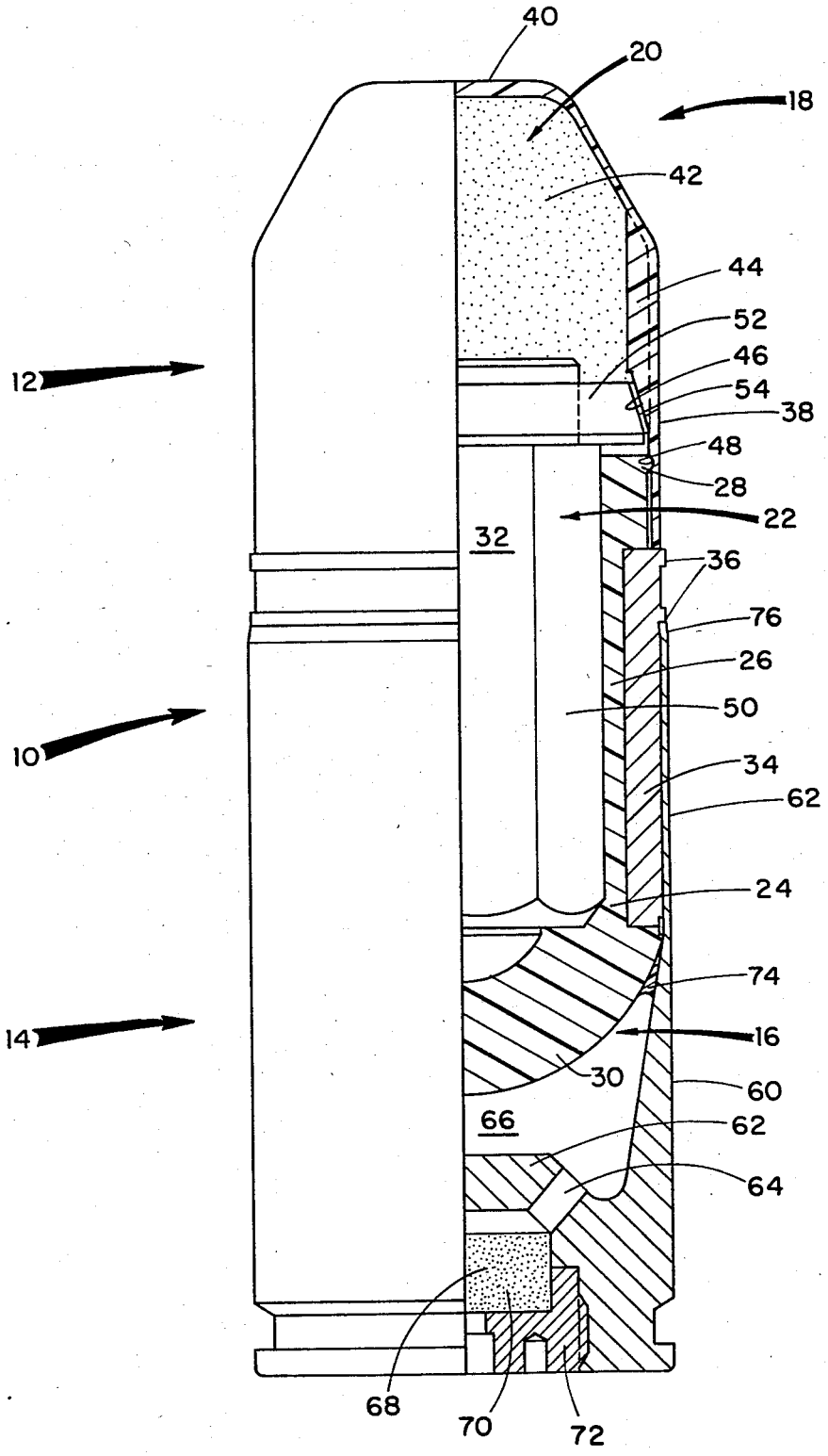

Referring now to the drawing there is illustrated a practice projectile cartridge assembly, generally indicated as 10, and comprised of a practice projectile assembly, generally indicated as 12, mounted to a cartridge case, generally indicated as 14. The practice projectile assembly 12 is comprised of a base member and a windshield member, generally indicated as 16 and 18, respectively, in which are disposed a signal powder and a piston member, generally indicated as 20 and 22, respectively.

The base member 16 is comprised of a body member 24 formed of a cylindrically-shaped side wall portion 26 including an outwardly-extending lip portion 28 formed about a terminal end thereof, and a hemispherically-shaped end wall portion 30 defining a cavity 32. A cylindrically-shaped band member 34 including ring-shaped rifling elements 36 is mounted about the cylindrically-shaped side wall portion 26 of the body member 24. The body member 24 is formed, for example, by injection molding techniques of a plastic material, such as phenylene oxide reinforced with glass fibers, of sufficient structural strength and exhibiting superior impact properties to withstand the impulse type loads imposed by propellant gases. The band member 34 is formed of an aluminum alloy to help spin the projectile and to maintain the projectile's position with respect to the centerline of the barrel as the projectile moves within the barrel. Generally, the band member 34 is mounted to the body member 24 in forming the base member 16 by positioning the band member 34 in a body mold assembly prior to injection molding of the body member 24. The band member 34 is fixed to the body member 24.

The windshield member 18 is formed of a cylindrically-shaped side wall portion 38 and a dome-shaped end wall portion 40 defining a cavity 42. The side wall portion 38 of the windshield member 18 is formed with a plurality of radially and inwardly extending longitudinally disposed rib sections 44 (one shown) including a tapered surface 46 extending inwardly towards the end wall portion 38 thereof. An interior surface of the side wall portion 38 of the windshield member 18 is formed with an inner groove 48 circumferentially-extending about the inner surface in a plane perpendicular to the axis of the windshield member 18 and cooperates with the lip portion 28 of the base member 16 as more fully hereinafter described. The windshield member 18 is formed of a plastic material, e.g. polystyrene exhibiting brittle physical properties to ensure shattering of the windshield member 18 upon impact of the projectile assembly 12. Generally, the plastic material should exhibit low elongation.

In the cavity 42 of the windshield member 18 there is disposed the signal powder 20 including a brightly colored dye component and other particulate material to provide suitable dispersion characteristics to the signal powder 20 upon impact of the projectile member 12 to permit visual observation thereof at far distances, e.g. 500 meters and more. A suitable signal powder could be orange-yellow powder, or a fluorescent pigment forming a fine powder which disperses as an aerosol cloud upon fracturing of the windshield member 18 upon impact of the projectile assembly 12.

The piston member 22 is comprised of a hexagonally-shaped body section 50 and an upper disc-shaped plate section 52 formed with a frusto conically-shaped outer surface 54 for cooperating with the tapered surface 46 of the rib sections 44 of the windshield member 18 as more fully hereinafter described. The shape of the body section 50 of the piston member 22, i.e. a hexagon, aids in the transmission of spin-up torque thereto. The piston member 22 is formed of a material to achieve a weight of the projectile assembly 12 proximate, and more preferably substantially identical to, that of an HEDP projectile, generally metal, e.g. steel. The piston member 22, in addition to providing ballast to achieve like weight characteristics, assists in the fracturing of the windshield member 18 upon impact of the projectile assembly 12 at the target area. It will be understood by one skilled in the art that the projectile assembly 12 of the present invention should be of an external configuration substantially identical to an HEDP projectile and likewise possess interior and exterior ballistic characteristics to such an HEDP projectile.

Assembly of the practice projectile assembly 12 from its component parts is readily effected by initially placing the windshield member 18 thereof in a holding fixture (not shown) with the end wall portion 40 pointed in a downward position thereby permitting access to the cavity 42. Into the cavity 42, there is disposed a suitable amount of the signal powder 20 whereupon the plate section 52 of the piston member 22 is inserted into the cavity 42 of the windshield member 18 to a point where the outer surface 54 of the plate section 52 of the piston member 22 contacts the tapered surface 46 of the rib sections 44 of the windshield member 18. Thereupon, the base member 16 with the cavity 32 thereof extending downwardly is inserted into the windshield member 18 whereby outer and inner surface portions of the wall portions 26 and 38 of the base member 16 and the windshield member 18, respectively, are in contacting relationship as illustrated in the drawing with downward movement of the base member 16 continued to a point where the lip portion 28 thereof is caused to be fully positioned within the groove 48 formed in the interior surface of the side wall 38 of the windshield member 18, i.e. the base member 16 is snapped into position within the windshield member 18. An adhesive, e.g. an epoxy resin, is applied about the outer surface portion of the side wall 26 of the base member 16 prior to positioning of the base member 16 within the windshield member 18 to thereby fixedly position such member to each other.

As hereinabove discussed, the practice projectile cartridge assembly 10 is comprised of the practice projectile assembly 12 mounted in the cartridge case 14. The cartridge case 14 is comprised of a cylindrically-shaped base member 60 including an intermediate wall member 62 having orifices 64 defining an upper U-shaped cavity 66 and a lower cavity 68. In the lower cavity 68, there is disposed a propellant 70 maintained by a base plug assembly 72. To form the cartridge assembly 10, an adhesive or sealant 74 is applied about the inner surface portion of the cartridge base member 60 defining the upper cavity 66 and the practice projectile assembly 12 inserted therein with the base member 16 extending into the upper cavity 66 and an upper circularly-shaped edge or lip portion 76 of the cartridge base 60 upset (not shown) into the band member 34 of the body member 16.

It will be appreciated by one skilled in the art that the present invention at the impact sight is chosen for one application to be explosively inert and that no shrapnel is explosively generated thereby to minimize injury to personnel even in the impact area other than in a line of flight trajectory. Additionally, the absence of unexploded projectiles, e.g. duds, permits the use of the area for training exercises other than restricting use to explosive ranges. Further, minimal production costs may be realized since the plastic components may be molded in a multiple-cavity mold by using conventional molding equipment with metal parts being produced in automatic machines with minimal expenditure of labor.

In use, after launching from the cartridge case 14, and upon impact, inertial forces on the piston member 22 cause the piston member 22 to move forward with the tapered surface 56 of the plate section 52 thereof to produce via the taperer surface 46 of rib sections 44 of the windshield member 18 a lateral force thereon to cause the same to burst open and release the signal powder 20. Such mechanical aid is quite effective and produces an almost 100% reliability on hard surfaces of a target media, and about 80% reliability in rough target areas, i.e. areas consisting of vegetation and trees.

While the invention herein has been described in connection with an exemplary embodiment thereof, it will be understood that many modifications will be apparent to those of ordinary skill in the art and that this application is intended to cover any adaptations or variations thereof.

What is claimed:

1. A practice projectile assembly, which comprises:

a base member;

a windshield member formed of a frangible material and defining a cavity;

a signal powder disposed in said cavity of said windshield member; and a piston member positioned within a chamber formed by joining said base member and said windshield member, said signal powder being disposed between said piston member and said windshield member.

2. The practice projectile assembly as defined in claim 1 wherein said windshield member is formed of a brittle plastic material.

3. The practice projectile assembly as defined in claim 2 wherein said windshield member is formed of a cylindrically-shaped side wall having an inner surface and a dome-shaped end wall defining said cavity, said inner surface of said side wall formed with a plurality of rib sections having a surface tapered inwardly towards said end wall.

4. The practice projectile assembly as defined in claim 3 wherein said piston member is formed with a plate member having a frusto conically-shaped surface for cooperating with said tapered surface of said rib sections of said windshield member.

5. The practice projectile assembly as defined in claim 1 wherein said piston member is formed with a hexagonally-shaped body member axially disposed with respect to said practice projectile.

6. The practice projectile assembly as defined in claim 5 wherein said piston member is formed of a metal.

7. The practice projectile assembly as defined in claim 1 wherein said base member is formed of a cylindrically-shaped side wall and a dome-shaped end wall thereby defining a cavity forming said chamber with said cavity of said windshield member.

8. The practice projectile assembly as defined in claim 7 wherein a band member is disposed about said side wall of said base member.

9. The practice projectile assembly as defined in claim 8 wherein said band member is formed with ring-shaped rifling elements.

10. The practice projectile assembly as defined in claim 9 wherein said band member is formed of a metal.

11. The practice projectile assembly as defined in claim 1 wherein said base member is formed of a plastic material exhibiting good mechanical properties.

12. A practice cartridge assembly comprised of a practice projectile assembly as defined in claim 1 mounted within a cartridge case assembly.

* * * * *